United States Patent
Karam et al.

(10) Patent No.: US 11,028,773 B2
(45) Date of Patent: Jun. 8, 2021

(54) COMPRESSED GAS INTEGRATED POWER AND THERMAL MANAGEMENT SYSTEM

(71) Applicant: Rolls-Royce North American Technologies Inc., Indianapolis, IN (US)

(72) Inventors: Michael Karam, Plainfield, IN (US); Robert Duge, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 457 days.

(21) Appl. No.: 16/140,067

(22) Filed: Sep. 24, 2018

(65) Prior Publication Data
US 2020/0025082 A1  Jan. 23, 2020

Related U.S. Application Data

(60) Provisional application No. 62/633,815, filed on Feb. 22, 2018.

(51) Int. Cl.
| | | |
|---|---|---|
| F02C 1/04 | (2006.01) | |
| F02C 7/08 | (2006.01) | |
| B64D 27/10 | (2006.01) | |
| F02C 6/00 | (2006.01) | |
| F02C 7/18 | (2006.01) | |
| F02C 7/32 | (2006.01) | |

(Continued)

(52) U.S. Cl.
CPC .............. *F02C 1/04* (2013.01); *B64D 27/10* (2013.01); *F02C 6/003* (2013.01); *F02C 7/08* (2013.01); *F02C 7/18* (2013.01); *F02C 7/32* (2013.01); *B64D 2027/026* (2013.01); *F02C 6/16* (2013.01); *F02C 6/20* (2013.01); *F05D 2220/76* (2013.01)

(58) Field of Classification Search
CPC ...... F02C 1/04; F02C 1/05; F02C 6/00; F02C 6/003; F02C 6/16; F02C 6/20; F02C 7/08; F02C 7/18; F02C 7/185; F02C 7/32; H02K 7/1823; F05D 2220/76; B64D 27/10; B64D 2027/026; F41H 13/0043–0087

See application file for complete search history.

(56) References Cited

U.S. PATENT DOCUMENTS

| | | | |
|---|---|---|---|
| 3,157,993 A | | 11/1964 | Düttmann |
| 4,355,508 A | * | 10/1982 | Blenke ..................... B60K 6/12 180/165 |

(Continued)

FOREIGN PATENT DOCUMENTS

| | | | | |
|---|---|---|---|---|
| EP | 1764494 A1 | * | 3/2007 | ............ H02J 15/006 |
| WO | WO-2005040581 A1 | * | 5/2005 | ................ F02C 9/26 |

OTHER PUBLICATIONS

U.S. Office Action dated Dec. 30, 2019, pp. 1-19, issued in U.S. Appl. No. 16/140,094, U.S. Patent and Trademark Office, Alexandria, VA.

(Continued)

*Primary Examiner* — Mark A Laurenzi
*Assistant Examiner* — Xiaoting Hu
(74) *Attorney, Agent, or Firm* — Brinks Gilson & Lione (57) ABSTRACT

Systems and methods are provided that use compressed gas to power a turbine, which in turn powers a generator, where an expansion of the compressed gas provides cooling for an electrical load that is powered by the generator.

17 Claims, 6 Drawing Sheets

(51) Int. Cl.
*B64D 27/02* (2006.01)
*F02C 6/16* (2006.01)
*F02C 6/20* (2006.01)

(56) References Cited

U.S. PATENT DOCUMENTS

| | | | |
|---|---|---|---|
| 4,827,716 | A | 5/1989 | Vershure, Jr. |
| 4,864,812 | A | 9/1989 | Rodgers et al. |
| 5,274,992 | A | 1/1994 | Klaass et al. |
| 5,385,011 | A | 1/1995 | Stewart, Jr. |
| 5,474,120 | A | 12/1995 | Severson et al. |
| 5,635,768 | A | 6/1997 | Birch et al. |
| 5,782,603 | A | 7/1998 | O'Brien et al. |
| 5,845,483 | A | 12/1998 | Petrowicz |
| 6,829,899 | B2 | 12/2004 | Benham, Jr. et al. |
| 6,941,760 | B1 | 9/2005 | Jones |
| 8,069,665 | B2 | 12/2011 | Pursifull et al. |
| 8,459,038 | B1 | 6/2013 | Lickfold et al. |
| 9,074,606 | B1 | 7/2015 | Moore |
| 10,393,017 | B2 | 8/2019 | Karam |
| 2004/0148934 | A1* | 8/2004 | Pinkerton ............ F02C 6/16 60/646 |
| 2005/0241311 | A1* | 11/2005 | Pronske ............ F25J 3/04618 60/645 |
| 2006/0016196 | A1* | 1/2006 | Epstein ............ F02C 6/12 60/773 |
| 2006/0059936 | A1 | 3/2006 | Radke et al. |
| 2006/0059937 | A1* | 3/2006 | Perkins ............ F02C 6/16 62/259.2 |
| 2006/0078034 | A1* | 4/2006 | Coffinberry ............ F02C 1/00 372/109 |
| 2007/0084211 | A1 | 4/2007 | Bowman et al. |
| 2011/0253896 | A1* | 10/2011 | Brown ............ F41G 1/35 250/349 |
| 2011/0271687 | A1 | 11/2011 | Nordstrom et al. |
| 2014/0013765 | A1 | 1/2014 | Studerus et al. |
| 2016/0368614 | A1 | 12/2016 | Endres |
| 2017/0016395 | A1* | 1/2017 | Kim ............ F01D 15/10 |
| 2018/0058330 | A1 | 3/2018 | Munevar |
| 2018/0119613 | A1* | 5/2018 | MacNaghten ............ F02C 6/16 |

OTHER PUBLICATIONS

"The Afterbody and its Mechanisms," Torpedoes Mark 14 and 23 Types Part 2, dated 2010, pp. 1-69 (41-109), Chapter 4, published by Historic Naval Ships Association, downloaded from https://archive.hnsa.org/doc/torpedo/part2.htm#pg54.

"Aircraft engine starting," Wikipedia, dated Sep. 23, 2018, pp. 1-7, published online by Wikipedia at URL https://en.wikipedia.org/wiki/Aircraft_engine_starting.

Anurak Atthasit, "Axial Flow Compressors-off Design Performance," Chulalongkom University Unit, dated Aug. 30, 2014, slide 3 of 18 entitled "Typical Compressor Map", published online by SlideShare at URL https://www.slideshare.net/AnurakAtthasit/aircraft-propulsion-axial-flow-compressors-off-design-performance.

"Auxiliary power unit," Wikipedia, dated Sep. 23, 2018, pp. 1-6, published online by Wikipedia at URL https://en.wikipedia.org/wiki/Auxiliary_power_unit.

Károly Beneda, Development of Active Surge Control Devices for Centrifugal Compressors, dated Jun. 2013, pp. 1-120, published by Budapest University of Technology and Economics, Budapest, Hungary.

M. M. Doustdar et al., "Effect of Anti-Surge Valve and Bypass Flow Control Mechanism on the Performance of Turbocharged Spark Ignition Engine at Altitude," Indian Journal of Scientific Research, dated 2014, ISSN:2250-0138, vol. 2, pp. 380-388, Varanasi: Global Academic Society, India.

U.S. Notice of Allowance, dated May 11, 2020, pp. 1-16, issued in U.S. Appl. No. 16/140,094, U.S. Patent and Trademark Office, Alexandria, VA.

* cited by examiner

COMPRESSED GAS INTEGRATED POWER AND THERMAL MANAGEMENT SYSTEM

CROSS-REFERENCE TO RELATED APPLICATIONS

This application is a non-provisional application of, and claims priority under 35 USC § 119(e) to, U.S. provisional 62/633,815, filed Feb. 22, 2018, the entire contents of which are incorporated by reference.

TECHNICAL FIELD

This disclosure relates to power systems and, in particular, to integrated power and thermal management systems.

BACKGROUND

Present integrated power and thermal management systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Typical heat engine power solutions may have problems at high altitudes, such as altitudes greater than 40,000 feet. In some examples, such problems may be encountered at high altitudes of 30,000 feet or greater. In particular, engines may be de-rated due to very low ambient air pressure, making it difficult to provide a relatively large amount of electrical power at higher altitudes using a typical heat engine to drive a generator. If an engine is sized to provide the electrical power just mentioned in addition to powering an aircraft at such altitudes, then the engine may be oversized for other operating conditions, such as at lower altitudes, resulting in being less fuel efficient under other operating conditions. Counterintuitively, it may also be difficult to provide cooling of electronics at extremely high altitudes—there may not be enough air flow to allow effective heat exchange with conventional systems.

Systems and methods are described herein that use compressed gas (such as compressed air) to drive a turbine, which powers a generator, where excess cooling capacity from the expanded gas may cool an electrical load that is powered by the generator. The system may be included in an aircraft, for example. For example, the system may be included in a fuselage, a wing, a nose, or any other part of the aircraft. The system may have other applications as well, and not necessarily at higher altitudes. For example, the system may be a portable system carried by a person. Such a system may be worn, for example, on a person's back. In some examples, the system may be arranged in a backpack. As another example, the system may be included in a land or water based vehicle such as a truck or a boat.

In one example, a power and thermal management system is provided that includes a tank of compressed gas, a heat exchanger, a turbine, and an electric generator. The heat exchanger is configured to receive a portion of the compressed gas from the tank at a lower pressure than in the tank. The turbine is configured to be driven by the compressed gas from the tank that passes through the heat exchanger. The electric generator is configured to be mechanically powered by the turbine. The system is configured as a primary electric power source for a load external to the power and thermal management system, and the heat exchanger is configured to cool the load from an expansion of the compressed gas released from the tank.

Figure 1:
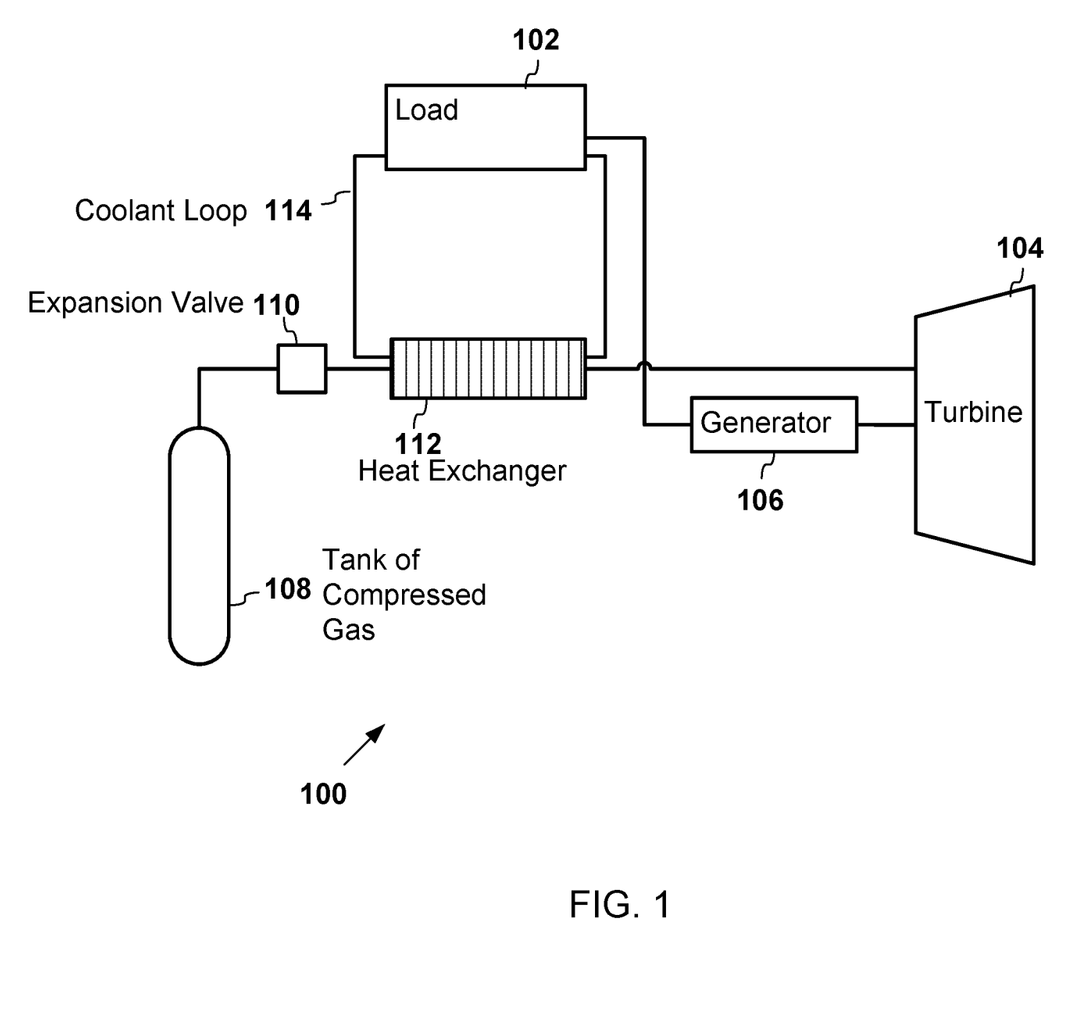
FIG. 1 is a schematic diagram of an example of a compressed gas power and thermal management system that uses compressed gas from a tank to both cool a load and drive a turbine.

FIG. 1 is a schematic diagram of an example of a compressed gas power and thermal management system 100 that uses compressed gas from a tank 108 to both cool a load 102 and drive a turbine 104. The turbine 104 powers a generator 106, which generates electricity for the load 102. The system 100 in the example shown includes the tank 108 of compressed gas, an expansion valve 110, a heat exchanger, the turbine 104, and the generator 106.

The system 100 illustrated in FIG. 1 may be an integrated power and thermal management system. An integrated power and thermal management system (IPTMS) is considered "integrated" because electrical power generated by the IPTMS may power one or more devices within the IPTMS, such as components of the thermal management system. Alternatively or in addition, the thermal management system may cool and/or heat components of the power management/generation system, such as the power electronics, the gearbox, generator, or any other component of the power management/generation system.

Alternatively, the system 100 may not be an integrated power and thermal management system. For example, the thermal management components of the system 100, such as the heat exchanger 112 and the coolant loop 114, may not cool any component of the power management/generation system, such as the generator 106 and the turbine 104, and the power management/generation components of the system 100 may not power any component of the thermal management system.

The load 102 may include any device or combination of devices that consumes electricity that may benefit from cooling and/or heating, and which is not part of the system 100. The load 102 excludes any component of the system 100 that generates or prepares electricity for delivery and further excludes any component of the system 100 that provides or manages cooling. Examples of the load 102 may include solid state electronics, a light-emitting diode (LED), an analog circuit, a digital circuit, a computer, a server, a server farm, a data center, a circuit that imposes a hotel load such as vehicle electronics, a circuit that imposes a primary load, a component of an aircraft, avionics, a directed-energy weapon, a laser, a plasma weapon, a railgun, a microwave generator, a pulse-powered device, a satellite uplink, an electrically powered machine, an electric motor, and any other electronic device that may benefit from heating and/or cooling. Examples of the directed-energy weapon may include a microwave weapon, a laser weapon, a pulsed energy projectile, a dazzler, a particle-beam weapon, a plasma weapon, and a sonic weapon.

The system 100 may be configured as a sole power source or a primary power source for the load 102. Alternatively, the system 100 may be configured as a backup power source or a supplementary power source for the load 102. The system 100 is configured as a primary power source for the load 102 if the system 100 is configured to power to the load 102 under typical operation of the load 102 and, under typical operation of the load 102, less than 85 percent of the electric power provided to the load 102 comes from any power source (or combination of power sources) that do not rely on compressed gas from a tank to power a turbine. The system 100 is configured as a sole power source if no other power source is configured to provide power to the load 102.

The tank 108 of compressed gas may be in fluid communication with the expansion valve 110, which in turn may be in fluid communication with an inlet of the heat exchanger 112. An outlet of the heat exchanger may be in fluid communication with the turbine 104. The turbine 104 may be mechanically coupled to the generator 106 such that the turbine 104 may drive the generator 106. The generator 106 may be electrically coupled to load 102. The heat exchanger 112 may be configured to transfer heat, for example via cooling fluid in a coolant loop 114, from the load 102 to the gas within the heat exchanger 112.

During operation of the system 100, compressed gas in the tank 108 expands as the gas passes through the expansion valve 110. The gas may cool substantially as a result of expanding through the expansion valve 110. For example, the cooled, expanded gas may be around minus 200 degrees Fahrenheit. The cooled, expanded gas may pass through the heat exchanger 112, thereby cooling the cooling fluid in the coolant loop 114 in order to cool the load 102 either via the cooling fluid directly as shown or through one or more thermal management components (not shown). Alternatively or in addition, the heat exchanger 112 may transfer heat from the load 102 to the expanded gas in the heat exchanger 112 using any other mechanism.

The gas exiting the heat exchanger 112 may be warmer than the gas that entered the heat exchanger 112 as a result of the heat transferred from the load 102 to the gas in the heat exchanger. Although at a lower pressure than the gas in the tank 108, the gas exiting the heat exchanger 112 may still be compressed as compared to the ambient gas or air in the atmosphere around the system 100. This compressed gas may flow past blades in the turbine 104 and into ambient gas or air in the atmosphere. As a result, the blades may rotate a rotor in the turbine 104, which in turn mechanically powers the generator 106 so that the generator 106 generates electricity. The electricity generated by the generator 106 may be supplied to the load 102. In other words, during the operation of the system 100, the system 100 uses the compressed gas in the tank 108 to electrically power the load 102 and thermally cool the load 102.

The turbine 104 may be any device or machine configured to transfer kinetic energy of fluid into rotational energy. Alternatively or in addition, the turbine 104 may be any device that extracts energy from a continuously moving stream of fluid. The turbine 104 may be a device comprising a rotor and one or more blades coupled to the rotor, where the rotor is configured to rotate if fluid, such as a gas, flows sufficiently fast past the one or more blades. The turbine 104 may be an axial flow machine, a radial flow machine, or any other design.

The generator 106 may be any electric generator. The generator 106 may be any device that converts motive power into electrical power. Examples of the generator 106 include a direct current (DC) generator and/or an alternating current (AC) generator.

The tank 108 for holding the compressed gas may be any vessel configured to hold gas at a pressure higher than outside of the vessel. The tank 108 may be made of metal, metal alloy, glass, or any other material suitable for containing one or more gases in the tank 108. The tank 108 may be cylindrical, round, or any other shape. Examples of the gasses may include air, oxygen, carbon dioxide, or any other gas.

The heat exchanger 112 may be any device configured to transfer heat between fluids or to transfer heat between a gas and a fluid. Examples of the heat exchanger 112 may include air-to-air heat exchanger, air-to-fluid heat exchanger, a shell and tube heat exchanger, a plate heat exchanger, a plate and shell heat exchanger, a plate fin heat exchanger, a micro-channel heat exchanger, a micro heat exchanger, a micro-scale heat exchanger, a microstructured heat exchanger, a direct contact heat exchanger, or any other type of heat exchanger.

The coolant loop 114 may include any a cooling path through which a coolant may circulate. The coolant may be any suitable coolant, such as air, water, inert gas, water-based coolant, oil, ethylene glycol, diethylene glycol, propylene glycol, polyalkylene glycol, Freon, refrigerant, anhydrous ammonia, or any other type of coolant.

Figure 2:
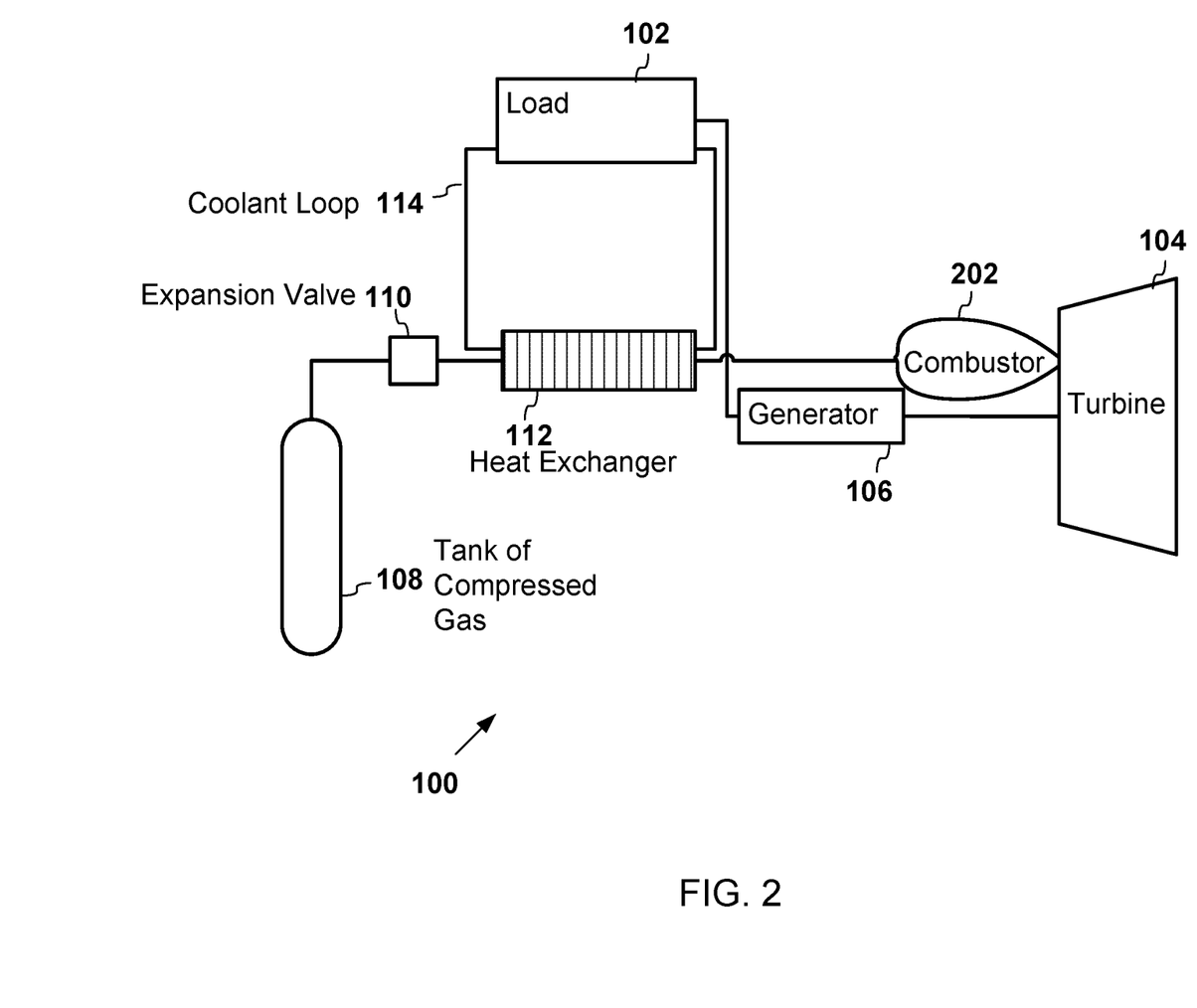
FIG. 2 illustrates an example of a system in which a heat exchanger is in fluid communication with a turbine via a combustor.

The system 100 may be implemented in many different ways. For example, FIG. 2 illustrates an example of the system 100 in which the heat exchanger 112 is in fluid communication with the turbine 104 via a combustor 202. During operation of the system 100, the compressed gas from the tank 108 flows through the expansion valve 110 and into the heat exchanger 112 just as in the example shown in FIG. 1. However, in the example shown in FIG. 2, the compressed gas leaving the heat exchanger 112 flows into the combustor 202. The compressed gas in the combustor 202 is injected with a fuel and the fuel is burned. The resulting exhaust gas from the combustor 202 then drives the turbine 104. The fuel may be any type of jet fuel or other fuel suitable for burning in the combustor 202.

The combustor 202 may be a component where combustion takes place. The combustor 202 may also be referred to as a combustion chamber and/or a burner. The combustor 202 may be configured to mix and ignite the compressed gas and fuel. In some examples, the combustor 202 may include one or more fuel injectors, swirlers, and or other components. Examples of the combustor 202 may include a can combustor, an annular combustor, a cannular combustor, or any other configuration of combustor.

The combination of the combustor 202 and the turbine 104 may be referred to as an engine. For example, the combustor 202 and the turbine 104 may be components of a gas turbine engine. The engine may or may not include a compressor. The engine does not necessarily include the compressor because the engine may receive compressed gas from the tank 108 instead from a compressor.

Figure 3:
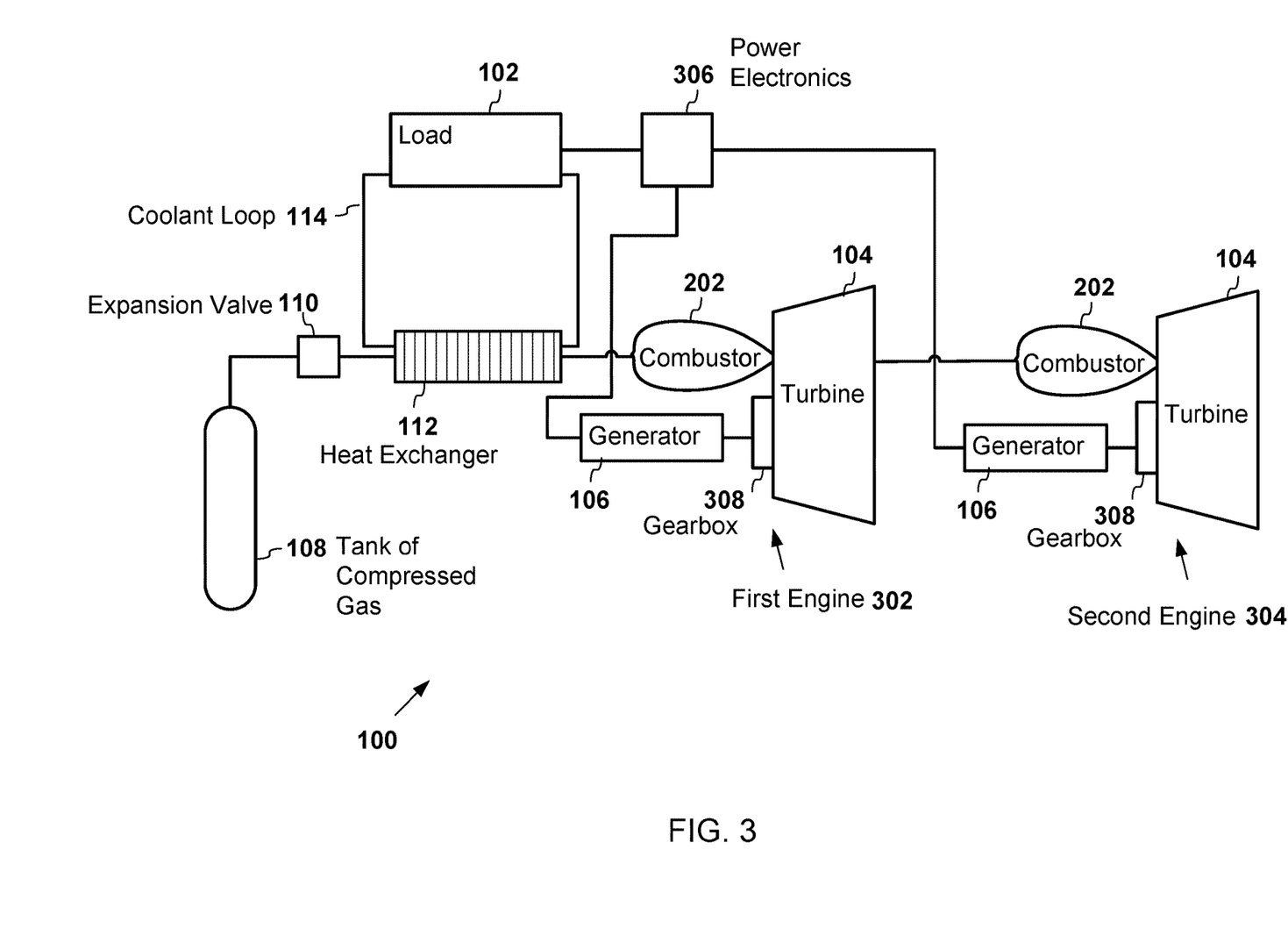
FIG. 3 is a schematic diagram of an example of a compressed gas power and thermal management system that includes two engines.

FIG. 3 is a schematic diagram of an example of the compressed gas power and thermal management system 100 that includes two engines 302 and 304, each of which includes a corresponding combustor 202 and a corresponding turbine 104. The example of the system 100 shown in FIG. 3 includes the tank 108 of compressed gas, the expansion valve 110, the heat exchanger 112, the two engines 302 and 304, two generators 106, power electronics 306, and two gearboxes 308.

During operation of the system 100 shown in FIG. 3, the compressed gas from the tank 108 flows through the expansion valve 110 and into the heat exchanger 112 just as in the example shown in FIG. 1. However, in the example shown in FIG. 3, the compressed gas leaving the heat exchanger 112 flows into the combustor 202 of the first engine 302. The fuel fed into the combustor 202 may mix with the compressed gas, burn, and gas exiting the combustor 202 powers the turbine 104 of the first engine 302.

Exhaust gas from the first engine 302 may flow into the combustor 202 of the second engine 304. The exhaust gas that enters the second engine 304 may still be compressed relative to the ambient air around the system 100. This compressed exhaust gas may flow into the combustor 202 of the second engine 304, where fuel is mixed with the compressed gas, burned, and gas exiting the combustor 202 powers the turbine 104 of the second engine 304.

Each of the turbines 104 may power a corresponding one of the generators 106 through, for example, a corresponding one of the gearboxes 308. The generators 106 may in turn generate electricity that is supplied to the load 102 through, for example, the power electronics 306. The power electronics 306 may modify and/or combine the electricity generated by the generators 106. For example, the power electronics 306 may convert AC from the generators 106 into DC. In some examples, one of the generators 106 may generate AC and the other may generate DC. In other examples, both of the generators 106 may generate AC. Alternatively, both of the generators 106 may generate DC.

Figure 4:
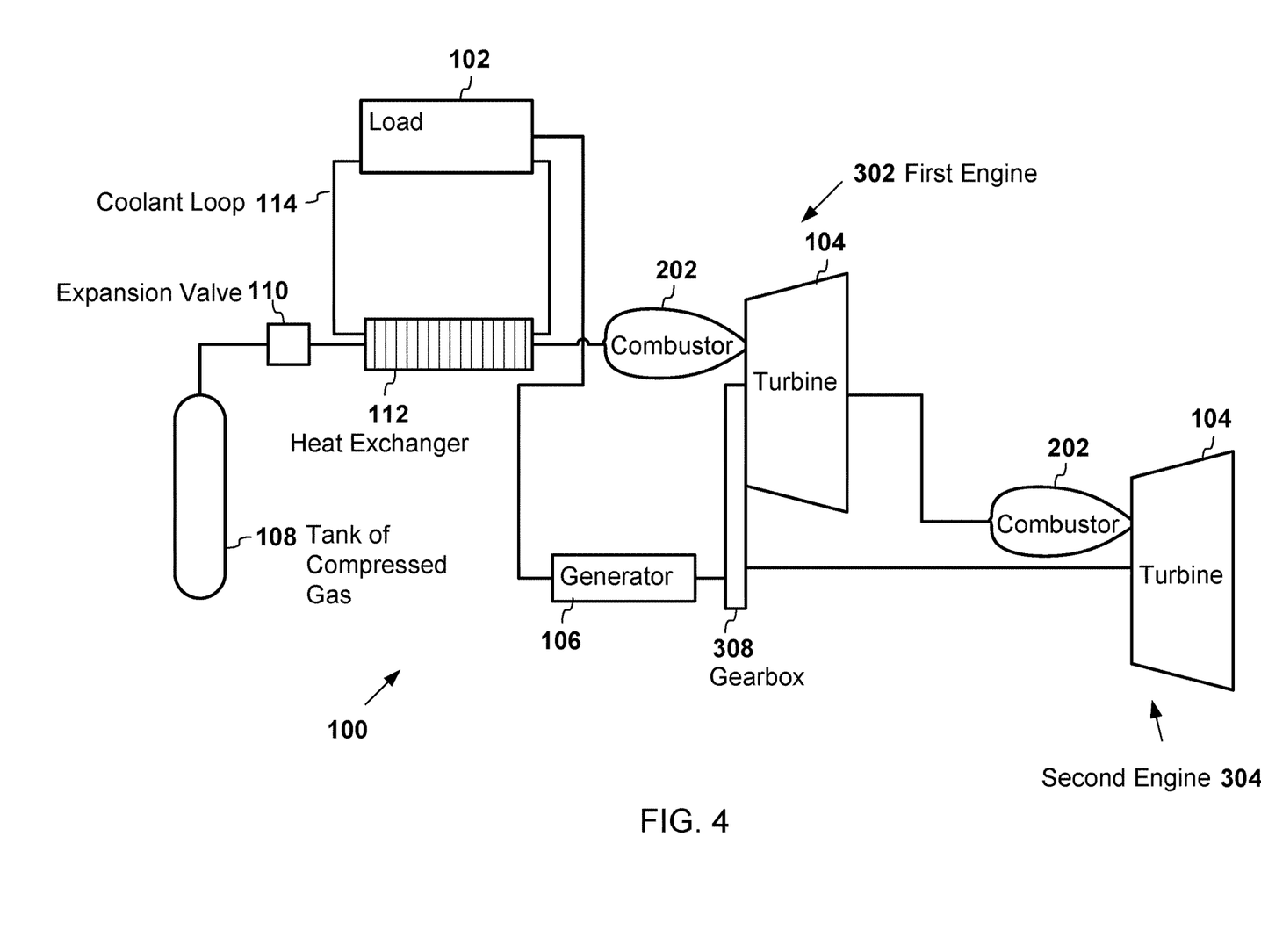
FIG. 4 illustrates another example of a compressed gas power and thermal management system.

However, the system 100 may include any suitable number of the generators 106, the gearboxes 308, and/or the power electronics 306. For example, FIG. 4 illustrates an example of the system 100 that does not include the power electronics 306 and includes only one generator 106 and only one gearbox 308. The turbines 104 may have turbine drive shafts geared together so as to power the single generator 106. The electricity generated by the generator 106 may be provided directly to the load 102. In some examples of the system 100 that include multiple generators 106, the generators 106 may be synchronized using any suitable synchronization mechanism so that the generators 106 each output alternating current (AC) that is in phase with the AC that is generated by the other respective generators.

The examples of the system 100 shown in FIG. 3 and FIG. 4 each includes the two engines 302 and 304. In other examples, the system 100 may include n number of the engines 302 and 304, where n is an integer greater than zero. In some configurations, the more engines 302 and 304 that are included in the system 100, the more efficiently the system 100 will be able use the compressed gas. Alternatively, the fewer engines 302 and 304 included in the system 100, the less efficiently the system 100 will be able to use the compressed gas. The more efficient the use of the compressed gas, the longer the compressed gas may last—assuming that the power output is held constant. On the other hand, the more engines 302 and 304 that are included in the system 100, the less efficient the system 100 may use fuel; and conversely, the fewer the engines 302 and 304 that are included, the more efficiently the system will use fuel. However, efficiency may depend on many factors, so these general rules about efficiency may not apply in some configurations.

Alternatively, the system 100 may not include any engines 302 and 304 that include the combustor 202. In this so-called "zero burner" configuration, the system 100 includes one or more turbines 104 none of which include any corresponding combustor 202. The example shown in FIG. 1 is one such "zero burner" configuration. In a "zero burner" configuration, the turbines 104 may be "chained together" in some examples. When "chained together," the turbines 104 may be arranged so that the gas exiting each one of the turbines 104 flows into the next turbine 104 in the chain until the gas exits the last turbine 104 in the chain. In some examples, one or more turbines 104 without a corresponding combustor 202 and/or engines 302 and 304 comprising the turbine 104 and the combustor 202 may be chained together.

In some examples, the system 100 may use the cooled, expanded gas downstream of the expansion valve 110 to provide cooling for components other than the load 102, such as the generator(s) 106 and the power electronics 306. At the same time, the expanded gas may be powering the turbine(s) 104. Powering the turbine(s) 104 may mean directly powering, such as in the example shown in FIG. 1, or indirectly, such as in the examples shown in FIGS. 3 and 4.

Figure 5:
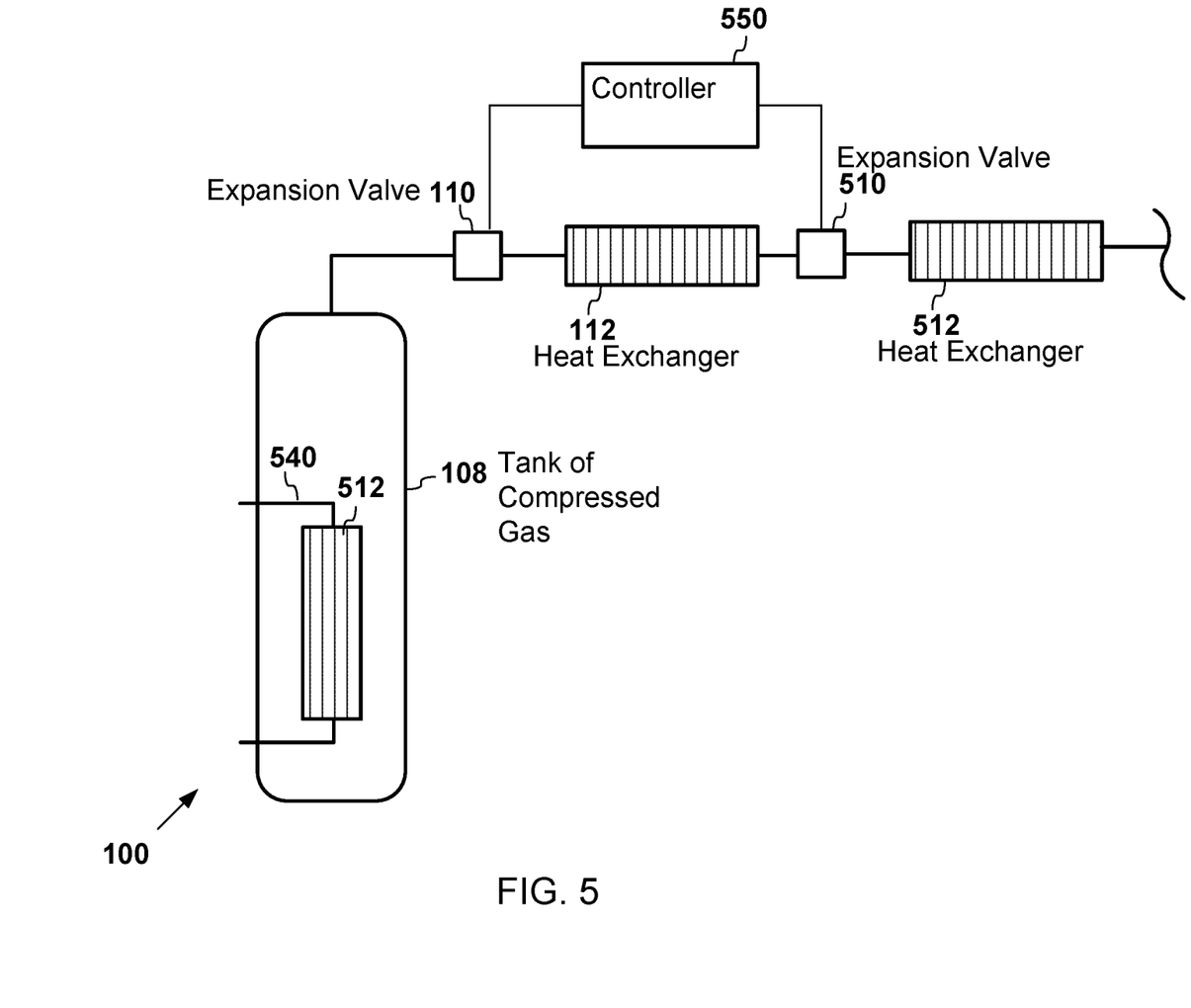
FIG. 5 illustrates a portion of a system that includes additional components.

The system 100 may include additional, different, and/or fewer components than shown in the examples illustrated in FIGS. 1 to 4. For example, FIG. 5 illustrates a portion of the system 100 that includes additional components, any of which may be used in combination with the components in any of the other examples described herein. The additional components shown in FIG. 5 include a second expansion valve 510 positioned downstream of the first heat exchanger 112, a second heat exchanger 512 positioned downstream of the second expansion valve 510, a third heat exchanger 512 arranged in the tank 108 of compressed gas, and a controller 550 configured to control one or more of the expansion valves 110 and 510.

The third heat exchanger 512, which is located inside of the tank 108 of compressed gas, may be used to warm the gas in the tank 108 and, conversely, be used as a source of cooling. As the gas leaves the tank 108 through the first expansion valve 110, the temperature of the gas in the tank 108 may drop. The heat exchanger 512 in the tank 108 may leverage that cooling effect to cool the load 102 or any other thermal load. In addition, heat transferred to the gas in the tank 108 via the heat exchanger 512 in the tank 108 may help avoid the compressed gas in the tank 108 from liquefying through a drop in temperature. A coolant loop 540 (only part of which is shown in FIG. 5) may transfer the heat to the heat exchanger 512 in the tank 108 from some other component, such as the load 102.

By adjusting the flow of the gas through the first and second expansion valves 110 and 510, the pressure drop through each of the expansion valves 110 and 510 may be controlled by, for example, the controller 550. As a result, the cooling capacity of each of first heat exchanger 112 and second heat exchanger 512 may be controlled. Alternatively, if the system 100 did not include the second heat exchanger 512, then the cooling capacity of the first heat exchanger 112 may be controlled even if the amount of compressed gas flowing through the second expansion valve 510 to the turbine 104 and/or engine 302 or 304 is varied over time. For example, the controller 550 may adjust the flow of the compressed gas through the first and second expansion valves 110 and 510 so as to maintain a substantially constant pressure drop between the first and second expansion valves 110 and 510 even though the amount of compressed gas flowing through the second expansion valve 510 to the turbine 104 and/or engine 302 or 304 is varied over time. In one such example, as the amount of compressed gas flowing through the second expansion valve 510 is increased, the amount of compressed gas flowing through the first expansion valve 110 may also be increased.

The amount of mechanical power generated by the turbine 104 may be controlled by adjusting the amount of compressed gas that flows to the turbine 104. For example, the controller 550 may adjust the amount that flows through the first expansion valve 110 and/or the second expansion valve 510. The controller 550 may adjust, for example, a size of an opening through the first expansion valve 110 and/or the second expansion valve 510 so that a target flow rate to the turbine 104 corresponds to a target power level of the turbine 104.

Even though two expansion valves 110 and 510 and two heat exchangers 112 and 512 are shown arranged in series in FIG. 5, any number of expansions valves 110 and 510 and heat exchangers 112 and 512 may be arranged in parallel or in series. Each of the heat exchangers 112 and 512 may be used to cool the load 102 and/or any other load.

The controller 550 may be any device that performs logic operations. The controller 550 may be in communication with a memory (not shown). The controller 550 may include a controller, engine control unit (ECU), engine control module (ECM), a general processor, a central processing unit, a computing device, an application specific integrated circuit (ASIC), a digital signal processor, a field programmable gate array (FPGA), a digital circuit, an analog circuit, a microcontroller, any other type of processor, or any combination thereof. The controller 550 may include one or more elements operable to execute computer executable instructions or computer code embodied in the memory.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

In some examples, the exhaust gas from the engine 302 or 304 (or from the last engine 302 or 304 in a series or chain) may operate to provide additional thrust from the engine 302 or 304. Similarly, the exhaust gas exiting the turbine 104 may provide additional thrust even if the turbine 104 is not paired with the combustor 202 and/or the system 100 is a "zero burner" configuration.

Alternatively or in addition, the exhaust gas may be used to create a condensation cloud. For example, the system 100 may include a water tank (not shown) from which water droplets may be sprayed into the exhaust gas to form the condensation cloud. The condensation cloud may be used for any purpose, such as signaling and/or as a countermeasure.

In some examples, carbon dioxide may be removed from the tank of compressed gas. Removing the carbon dioxide may help prevent liquification of carbon dioxide, allowing colder temperatures to be attained with all-gaseous operation.

The system 100 may be configured to provide a predetermined average amount of power for a predetermined amount of time. For example, the tank 108, the engines 302 and 34, and the generator(s) 106 may be sized accordingly.

Alternatively or in addition, combustors 202 and/or expanders may be added to the system 100 as needed in order to optimize a duty cycle for an application.

In some examples, the engine(s) 302 and 304 may supply power to and/or provide propulsion for an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the engine 302 and 304 may be utilized in a configuration unrelated to powering the aircraft.

Figure 6:
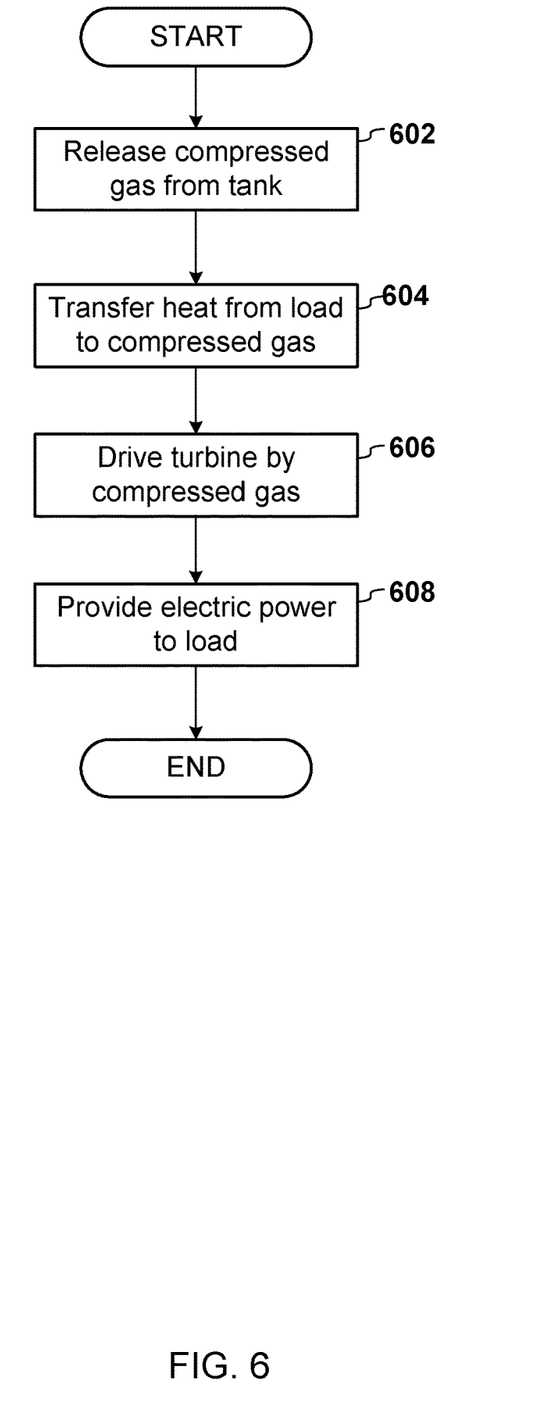
FIG. 6 illustrates a flow diagram of example steps for providing power and thermal management.

FIG. 6 illustrates a flow diagram of example steps for providing power and thermal management. The steps may include additional, different, or fewer steps than illustrated in FIG. 6. The steps may be executed in a different order than illustrated in FIG. 6.

Compressed gas may be released (602) from the tank 108 into the heat exchanger 112. For example, the compressed gas may flow through the expansion valve 110 into the heat exchanger 112 downstream of the expansion valve 110.

Heat from the load 102 may be transferred (604) to the compressed gas. For example, heat may be transferred to the compressed gas in the heat exchanger 112 via the coolant loop 114.

The turbine 104 may be driven (606) by the compressed gas. For example, the compressed gas that is heated in the heat exchanger 112 may be directed to flow past the blades of the turbine 104.

The electric generator 106 may be mechanically powered (608) by the turbine 104. For example, the turbine 104 may turn a shaft that rotates coils in the electric generator 106.

Electric power generated by the electric generator 106 may be provided (610) to the load 102 as a primary power source. The steps illustrated in FIG. 6 may be performed in parallel as the load 102 is continuously powered and cooled by the system 100.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A power and thermal management system of an aircraft, the power and thermal management system comprising:
   a tank of compressed gas;
   a heat exchanger configured to receive a portion of the compressed gas from the tank at a lower pressure than in the tank;
   a first expansion valve upstream of the heat exchanger;
   a first turbine configured to be driven by the compressed gas from the tank that passes through the heat exchanger;

a second expansion valve downstream of the heat exchanger and upstream of the first turbine;

a controller configured to adjust a flow of the compressed gas through the first expansion valve and the second expansion valve in order to control a cooling capacity of the heat exchanger;

a first electric generator configured to be mechanically powered by the first turbine;

a second electric generator; and a second turbine configured to mechanically power the second electric generator, wherein the second turbine is configured to be driven by the compressed gas exhausted from the first turbine, wherein the power and thermal management system for the aircraft is configured as a primary electric power source for a directed energy weapon external to the power and thermal management system, and wherein the heat exchanger is configured to cool the directed energy weapon from an expansion of the compressed gas released from the tank.

2. The system of claim 1 further comprising a heat exchanger in the tank, wherein the heat exchanger in the tank is configured to transfer heat received from the directed energy weapon to the compressed gas within the tank.

3. The system of claim 1 further comprising a combustor configured to receive compressed gas from the tank via the heat exchanger, the combustor further configured to burn fuel mixed with the compressed gas from the tank, and the combustor further configured to exhaust into the first turbine.

4. The system of claim 1, wherein one of the first and second electric generators is configured to generate AC, and the other of the first and second electric generators is configured to generate DC.

5. The system of claim 1, wherein the system is an integrated power and thermal management system.

6. A power and thermal management system comprising:
a tank of compressed gas;
a heat exchanger configured to receive a portion of the compressed gas from the tank at a lower pressure than in the tank;
a first expansion valve upstream of the heat exchange;
a turbine configured to be driven by the compressed gas from the tank that passes through the heat exchanger;
a second expansion valve downstream of the heat exchanger and upstream of the turbine;
a controller configured to adjust a flow of the compressed gas through the first expansion valve and the second expansion valve in order to control a cooling capacity of the heat exchanger; and
an electric generator configured to be mechanically powered by the turbine,
wherein the system is configured as a primary electric power source for a load, and
wherein the heat exchanger is configured to cool the load from an expansion of the compressed gas released from the tank.

7. The system of claim 6, wherein the load comprises a directed energy weapon, and wherein the system is configured as a sole electric power source for the directed energy weapon.

8. The system of claim 6, wherein the tank, the turbine, the electric generator, and the heat exchanger are included in an apparatus configured to be worn by a person.

9. The system of claim 6 further comprising a heat exchanger inside of the tank, wherein the heat exchanger inside of the tank is configured to transfer heat to the compressed gas within the tank via a coolant loop.

10. The system of claim 6, wherein the turbine is a first turbine, wherein the system further comprises a second turbine and a gearbox, wherein the first and the second turbines are configured to mechanically power the electric generator via the gearbox, and wherein the second turbine is further configured to be driven by the compressed gas exhausted from the first turbine.

11. The system of claim 6 further comprising a combustor configured to receive compressed gas from the tank via the heat exchanger, the combustor further configured to burn fuel mixed with the compressed gas from the tank, and the combustor further configured to exhaust into the turbine.

12. The system of claim 11, wherein the combustor and the turbine are a first combustor and a first turbine, respectively, wherein the system further comprises a second combustor and a second turbine, the second combustor configured to receive compressed gas exhausted from the first turbine, the second combustor further configured to burn fuel mixed with the compressed gas, and the second combustor further configured to exhaust into the second turbine.

13. A method of providing power and thermal management, the method comprising:
releasing compressed gas from a tank into a heat exchanger;
controlling, via a controller, a flow of the compressed gas through a first expansion valve upstream of the heat exchanger;
transferring heat to the compressed gas in the heat exchanger from a load;
controlling, via the controller, the flow of the compressed gas through a second expansion valve downstream of the heat exchanger and upstream of a turbine;
controlling, via the controller, a cooling capacity of the heat exchanger by adjusting the flow of the compressed gas through the first expansion valve and the second expansion valve;
driving the turbine by the compressed gas that is heated in the heat exchanger;
powering an electric generator mechanically by the turbine; and
providing electric power generated by the electric generator to the load as a primary power source.

14. The method of claim 13, wherein the releasing, the transferring, the driving, the powering, and the providing are performed at an altitude greater than 30,000 feet.

15. The method of claim 13 further comprising transferring heat from the load to the compressed gas in the tank via a heat exchanger located inside of the tank.

16. The method of claim 13, wherein the driving the turbine by the compressed gas comprises mixing the compressed gas with fuel to form a mixture, combusting the mixture in a combustor, and driving the turbine with exhaust from the combustor.

17. The method of claim 13 further comprising reaching a target power generated by the turbine by controlling an amount of the compressed gas that flows to the turbine from the heat exchanger.

* * * * *